(12) United States Patent
Pison et al.

(10) Patent No.: US 8,989,134 B2
(45) Date of Patent: Mar. 24, 2015

(54) ALLOTMENT OF RADIO RESOURCES IN A BASE STATION OF A BROADBAND NETWORK

(75) Inventors: Laurent Pison, Jouars Ponchartrain (FR); Olivier Paterour, Guyancourt (FR)

(73) Assignee: Airbus DS SAS, Elancourt (FR)

( * ) Notice: Subject to any disclaimer, the term of this patent is extended or adjusted under 35 U.S.C. 154(b) by 546 days.

(21) Appl. No.: 13/375,746

(22) PCT Filed: Sep. 24, 2010

(86) PCT No.: PCT/EP2010/064195
§ 371 (c)(1),
(2), (4) Date: Dec. 1, 2011

(87) PCT Pub. No.: WO2012/037987
PCT Pub. Date: Mar. 29, 2012

(65) Prior Publication Data
US 2012/0147843 A1 Jun. 14, 2012

(51) Int. Cl.
*H04W 4/00* (2009.01)
*H04L 5/00* (2006.01)
*H04W 72/10* (2009.01)

(52) U.S. Cl.
CPC ............ *H04L 5/0064* (2013.01); *H04L 5/0044* (2013.01); *H04W 72/10* (2013.01)
USPC ....................................................... 370/330

(58) Field of Classification Search
CPC ..... H04W 72/04; H04W 88/08; H04W 76/00; H04W 72/0446; H04W 72/0453
USPC ......... 370/330, 341, 436, 431, 478, 328, 329, 370/338, 310
See application file for complete search history.

(56) References Cited

U.S. PATENT DOCUMENTS

| | | | | |
|---|---|---|---|---|
| 7,522,924 | B2* | 4/2009 | Abeta et al. | 455/452.2 |
| 8,009,623 | B2* | 8/2011 | Higuchi et al. | 370/329 |
| 2003/0021245 | A1* | 1/2003 | Haumonte et al. | 370/330 |
| 2009/0296835 | A1 | 12/2009 | Hidaka | |

FOREIGN PATENT DOCUMENTS

| WO | WO 2010/076773 A2 | 7/2010 |
|---|---|---|
| WO | WO 2010/087334 A1 | 8/2010 |

OTHER PUBLICATIONS

International Search Report completed Jul. 25, 2011 and mailed Jul. 29, 2011 from corresponding International Application No. PCT/EP2010/064195 filed Sep. 24, 2010 (4 pages).
Written Opinion completed Jul. 25, 2011 and mailed Jul. 29, 2011 from corresponding International Application No. PCT/EP2010/064195 filed Sep. 24, 2010 (6 pages).

* cited by examiner

*Primary Examiner* — Anh Ngoc Nguyen
(74) *Attorney, Agent, or Firm* — Klein, O'Neill & Singh, LLP

(57) ABSTRACT

In order for professional mobile terminals for a critical mission of public security to make use of the radio infrastructure of a broadband network, for instance of the LTE type, the downward and upward frames are configured in a base station each in a first area dedicated to mobile terminals of lower priority and a second area dedicated to mobile terminals of critical mission of high priority. In the second area, sub-channels dedicated to a group of terminals of critical mission are allotted by order of priority to this group, to another group of mobile terminals of critical mission and to mobile terminals of lower priority.

20 Claims, 4 Drawing Sheets

ALLOTMENT OF RADIO RESOURCES IN A BASE STATION OF A BROADBAND NETWORK

CROSS-REFERENCE TO RELATED APPLICATION

This is a national phase application under 35 U.S.C. §371 of PCT Application No. PCT/EP2010/064195, filed Sep. 24, 2010, the contents of which are expressly incorporated herein by reference.

FIELD OF ART

The present disclosure relates to the allotment of resources in a base station of a radio-communications network communicating with mobile terminals through radio resources shared in a frequency broadband and during radio frames.

BACKGROUND

The broadband network may be based on the LTE ("Long Term Evolution") technology or the mobile WiMAX "Worldwide interoperability for Microwave Access") technology and support radio links with the mobile terminals of the orthogonal frequency multiplexing multiple access OFDMA ("Orthogonal Frequency Division Multiple Access") type, and of the single carrier frequency multiplexing multiple access SC-FDMA ("Single Carrier Frequency Division Multiple Access") type.

Radio resources of traffic offered both in the frequency field and the time field are limited by the frames configured in a base station of such network of the general public type and are shared in a variable way between active radio links with the mobile terminals under the coverage of the base station. The service qualities, including in terms of flow-rate, are variable as a function of the various types of communications with mobile terminals. The base station should permanently adapt dynamically to the characteristics of the services being offered to mobile terminals and requested by the latter. When an application in the base station or in a mobile terminal requires radio resources, the station allots to it resources selected amongst the available resources in the frames while trying to meet the amount of required resources. The base station then periodically modifies in the frames the allotment of resources to the communications with the mobile terminals as a function of their needs in resources. The position in frequency and in time of the resources allotted to a link with a mobile terminal in a downward or upward radio frame is not strictly determined and may change from one frame to the next one. For instance, resources spreading on a few sub-carriers in a narrow band and a few consecutive periods of symbols defining a block of resources having a determined position in a frame are allotted to a terminal in a frame and are allotted to another terminal in a subsequent frame. According to another example, the base station allots to a terminal block of resources in a frame and a block of resources having a position different from the previous one in a subsequent frame. Consequently, a block of resources having a determined position in a frame might be allotted a priori to any of the mobile terminals.

Moreover, although the frequency band is broad, the resources in a frame are limited and the base station is sometimes unable to access all the communication requests with the mobile terminals or all the service qualities of the communications.

Furthermore, it is known to use for services of critical mission of public security a professional private terrestrial narrow band radio communications network PMR ("Professional Mobile Radio") for instance of the DMR type (("Digital Mobile Radio"), TETRA "Terrestrial Trunked Radio") or P25 with digital cellular radio interfaces based, more specifically, on the IP protocol ("Internet Protocol"). It is also known to gather stationary and mobile terminals by groups in the professional private network so that any terminal member of a group is able to transmit vocal data, or sometimes short messages at higher flow-rates, to other terminal members of the group through the infrastructure of the network and to receive data from any other terminal belonging to the group through the infrastructure of the network. The stationary and mobile terminals of a group can only communicate therebetween. Sharing radio resources ("trunking") in a base station of the professional private network is carried out in the shape of channels, the number and the flow-rates of which are determined, so as to safely meet the needs in resources of communications and in radio coverage of the mobile terminals.

The use constraints of the professional private network, as reliably establishing all the communications needed for operating a group of terminals so that all the members of this group are able to permanently communicate therebetween data including vocal ones, are not compatible with the variable and dynamic and thus, unsure, allotment, of the radio resources offered by a base station in a broadband network of the general public type, and with the resetting of the allotment of the order of the millisecond, either every frame or every sub-frame of each frame, in the base station.

SUMMARY

The present method, system and device aim at overcoming such incompatibility, providing the radio infrastructure with a broadband network with professional mobile terminals so that the latter are used for a critical public security mission like in a professional private narrow band network.

To this end, a method in a base station for allotting blocks of radio resources to mobile terminals in downward frames emitted by the base station and in upward frames received from the mobile terminals, the blocks of resources being distributed in time and in frequency in the frames, is characterized in that it comprises:

a configuration of each downward frame into first and second areas dedicated to the data respectively to be emitted toward first and second mobile terminals and of each upward frame into first and second areas dedicated to the data respectively to be received from the first and second terminals, an allotment of blocks of resources in the first areas of the downward and upward frames between data to be emitted to and to be received from the first mobile terminals, the positions of a block of resources allotted to data to be emitted toward a first terminal and of a block of resources allotted to data to be received from the first terminal being variable in the first areas, an allotment of at least one block of resources having a predetermined position in the second areas of the downward frames in priority to data to be emitted to all the second mobile terminals, and an allotment of at least one block of resources having a predetermined position in the second areas of the upward frames in priority to data to be received from one of the second mobile terminals.

The base station is incorporated into a broadband radio communications network wherein the first mobile terminals are to be used for most of them by users of the public. The blocks of resources in the first areas of the downward and upward frames are allotted in a variable and unsure way as in a known broadband network. On the other hand, the second mobile terminals are professional private terminals and can make up at least one group for a critical mission of public security. The automatic dedication of blocks of resources in the second areas of the downward and upward frames as a function of needs in radio communication resources of all the second mobile terminals and the priority allotment of blocks of resources having predetermined positions in the second areas in priority to data of traffic to be emitted toward the second mobile terminals and to be received from the second mobile terminals provide the quick establishment of communications between the second mobile terminals and the holding of such communications. The blocks of resources thus dedicated to communications established between the second mobile terminals of an active group have their positions strictly determined in the frames and cannot be thus allotted during such communications being established to other terminals of another group or to first terminals.

The broadband network may be used for operating several groups of professional private terminals. In such a case, the allotment method comprises:

a configuration of the second area of each downward frame in first sub-channels dedicated to data to be emitted respectively toward groups of second mobile terminals, the first sub-channels having predetermined flow-rates and being each made up by at least one block of resources having a predetermined position in the second area of the downward frames, and a configuration of the second area of each upward frame in second sub-channels dedicated to data to be received respectively from the groups of second mobile terminals, the second sub-channels having predetermined flow-rates and being each made up by at least one block of resources having a predetermined position in the second area of the upward frames, an allotment of the first sub-channels in priority to data to be emitted respectively toward the groups of second terminals, and an allotment of a second sub-channel dedicated to a group in priority to data to be received from one of the second terminals of the group.

The base station may be adapted to simultaneously or not adapt traffic data of various qualities of service, such as of voice and images or video sequences, by the base station to a group of terminals. For instance, the data of traffic are the voice of users of the terminals of the group and an image or a video sequence transmitted by a terminal of the group through the infrastructure of the broadband network. In this case, the present method, system and device may comprise a dedication of first sub-channels having different predetermined flow-rates and respectively made up by blocks of resources having predetermined positions in the second area of downward frames for a first of the groups of second mobile terminals, and an allotment of a first sub-channel in priority to the data to be emitted with at the most the flow-rate of the first sub-channel to the first group.

The service quality parameters may be different from one group to another. If a first group needs to often use a first sub-channel with a high flow-rate in the downward frames, such a channel might be automatically dedicated to it. In contrast, if a second sub-channel with a high flow-rate is dedicated in the downward frames for a second group that only sporadically uses it, the second sub-channel occupies some pass band most often unnecessarily. In order of avoid such a dedication for the second group and make possible an emission of data at a high flow-rate by the base station toward the second group, the method may comprise, when the flow-rate of data to be emitted toward the mobile terminals of a second group is higher than the flow-rate of any first sub-channel dedicated to the second group and at the most equal to the flow-rate of one of said several first sub-channels dedicated to the first group, a temporary allotment of said first sub-channel to the data to be emitted toward the mobile terminals of said second group as long as no data should be emitted toward the first group in said a first sub-channel.

Alternatively, the temporary allotment may only be carried out if the sum of the flow-rates of the sub-channels dedicated to the second group is lower than the flow-rate of data of traffic to be emitted toward the second group. In this alternative, sub-channels dedicated to the second group may be momentarily aggregated into a sub-channel with a higher flow-rate for meeting a flow-rate need of the second group.

When a first group of mobile terminals is inactive and the other groups do not need any resources in addition to the amount of the resources dedicated to them, the pass band dedicated to the first group in the downward frames remains unoccupied. The present method, system and device then provide making available such an unoccupied pass band for downward links with the first terminals, that is terminals, such as terminals of the general public, for which communications have a lower priority than the communications for the terminals of a group. To this end, the method may comprise, when the first area in the downward frames is unavailable so that a portion of the latter is allotted to the data to be emitted toward a first mobile terminal, a temporary allotment of one of said first sub-channels to the data to be emitted toward the first mobile terminal as long as no data it to be emitted toward the mobile terminals of the groups in said a first sub-channel.

The present method, system and device provide temporary selective dedications and allotments in the second areas of the upward frames for reasons similar to the temporary dedications and allotments presented above in the second areas of the downward frames. In one embodiment, the present method, system and device may comprise a dedication of second sub-channels having second different predetermined flow-rates and respectively made up by blocks of resources having predetermined positions in the second area of the upward frames for the first group, and an allotment of a second sub-channel in priority to the data to be received with at the most the flow-rate of the first sub-channel of one of the mobile terminals of the first group. In another embodiment, the present method, system and device may comprise, when the flow-rate of data to be received from one of the mobile terminals of a second group is higher than the flow-rate of any sub-channel dedicated to the second group and at the most equal to the flow-rate of one of said second sub-channels dedicated to the first group, a temporary allotment of said a second sub-channel to the data to be received from said a mobile terminal of the second group as long as no data is to be received from the first group in said a second sub-channel. In yet another embodiment, the present method, system and device may comprise, when the first area in the upward frames is unavailable so that a portion of the latter is allotted to data to be received from a first mobile terminal, a temporary allotment of one of said second sub-channels to the data to be received from the first mobile terminal as long as no data is to be received from the mobile terminals of the groups in said a second sub-channel.

According to another aspect of the present method, system and device, in order to increase the rapidity of allotment of resources in the second areas of the upward frames to data of traffic to be received from a second terminal, a second subchannel may be allotted to the data to be received from a mobile terminal of the first group when the base station has received at least the one of several allotment requests emitted in a signalling field for the upward frames by said a mobile terminal of the first group.

In order to reduce the amount of resources in upward or downward frames dedicated to the sub-channels of a group having different flow-rates, it is preferred that sub-channels dedicated to this group in upward or downward frames have multiple integer flow-rates of a minimal flow-rate of one of the sub-channels, and that a sub-channel dedicated to this group having a flow-rate immediately higher than that of another sub-channel dedicated to this group comprises the blocks of resources dedicated of the other sub-channel.

The present method, system and device also relate to a combination of downward frames to be emitted by a base station toward mobile terminals and of upward frames to be received from mobile terminals by the base station, blocks of resources being distributed in time and in frequency in the frames. The combination is characterized in that it comprises:
in each downward frame, first and second areas dedicated to data respectively to be emitted toward first and second mobile terminals and, in each upward frame, first and second areas dedicated to data respectively to be received from the first and second terminals,
in the first areas of the downward and upward frames, blocks of resources to be allotted in a shared way between the data to be emitted toward and to be received from the first mobile terminals, the positions of a block of resources to be allotted to data to be emitted toward a first terminal and of a block of resources to be allotted to data of traffic to be received from the first terminal being variable in the first areas,
in the second areas of the downward frames, at least one block of resources having a predetermined position to be allotted in priority to data to be emitted toward all the second mobile terminals, and
in the second areas of the upward frames, at least one block of resources having a predetermined position to be allotted in priority to data to be received from one of the second mobile terminals.

The present method, system and device also relate to a base station adapted to allot blocks of radio resources to mobile terminals in downward frames to be emitted by the base station and in upward frames to be received from the mobile terminals, the blocks of resources being distributed in time and in frequency in the frames. The base station is characterized in that it comprises:
a means for configuring each downward frame into first and second areas dedicated to data respectively to be emitted toward first and second mobile terminals and each upward frame into first and second areas dedicated to data respectively to be received from the first and second terminals,
a means for allotting blocks of resources in the first areas of the downward and upward frames shared between data to be emitted to and to be received from the first mobile terminals, the positions of a block of resources allotted to data to be emitted toward a first terminal and of a block of resources allotted to data to be received from the first terminal being variable in the first areas,
a means for allotting at least one block of resources having a predetermined position in the second areas of the downward frames in priority to data to be emitted toward all the second mobile terminals, and
a means for allotting at least one block of resources having a predetermined position in the second areas of the upward frames in priority to data to be emitted toward all the second mobile terminals.

The present method, system and device also relate to a broadband radio communications network comprising base stations and mobile terminals. The network is characterized in that each base station is in accordance with the present method, system and device.

Finally, the present method, system and device relate to a computer programme adapted to be implemented in a base station. The programme is characterized in that it comprises instructions which, when the programme is carried out in the base station, achieve the method of the present method, system and device.

BRIEF DESCRIPTION OF THE FIGURES

Additional characteristics and advantages of the present method, system and device shall become readily apparent from the description that follows of several embodiments, given as non limitative examples, with reference to the accompanying drawings, in which.

DETAILED DESCRIPTION

Figure 1:
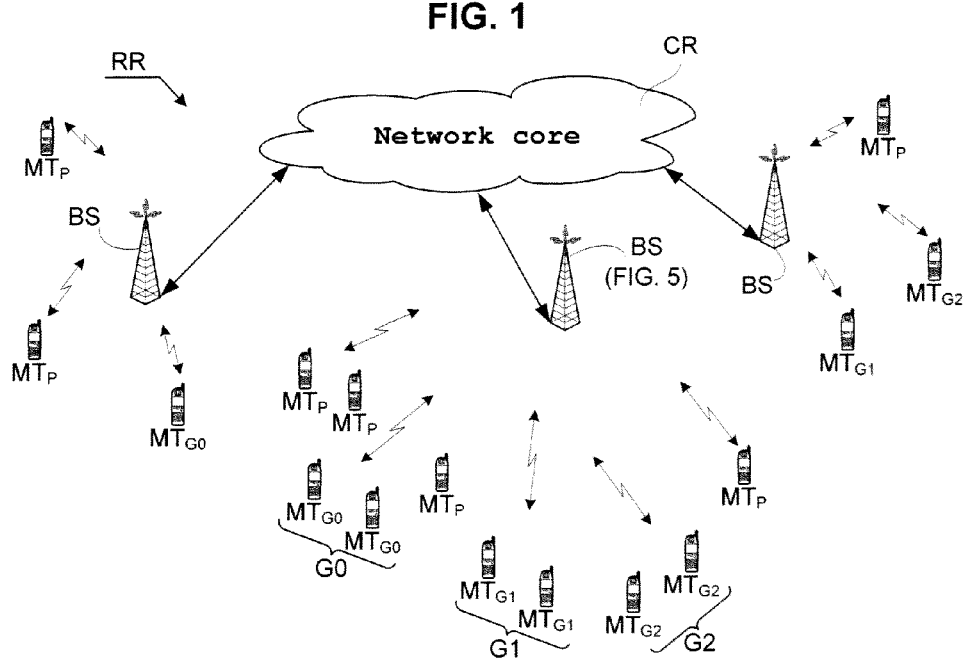
FIG. 1 is a schematic flowchart of a broadband radio communications network according to the present method, system and device.

Referring to FIG. 1, a broad band cellular radio communications network RR comprises base stations BS and user mobile terminals $MT_P$ and $MT_G$ able to communicate with the base stations.

All the base stations being identical, the distribution of radio resources to be described hereinafter relates to a radio cell covered by a base station BS and first mobile terminals $MT_P$, and second mobile terminals $MT_G$ located under the coverage of the radio cell. The communications for the first mobile terminals, so-called terminals of low priority $MT_P$, have a lower priority than the communications of higher priority for the second mobile terminals $MT_G$, so-called terminals of critical mission. The first mobile terminals comprise mobile terminals of the general public type, either private persons or companies, and optionally private terminals adapted for critical missions and having a lower priority than the second mobile terminals $MT_G$.

The mobile terminals communicate with the base station through periodical frames $TR_{DL}$ of downward links (DL) emitted by the base station toward the mobile terminals and periodical frames $TR_{UL}$ of upward links (UL) emitted from the mobile terminals toward the base station BS. The frames make up radio resources in a limited number that the base station should distribute between the mobile terminals as a function of the needs in quality of service of the terminals.

Signalling and traffic data are transmitted to the radio interface between the base station BS and the mobile terminals.

Figure 2:
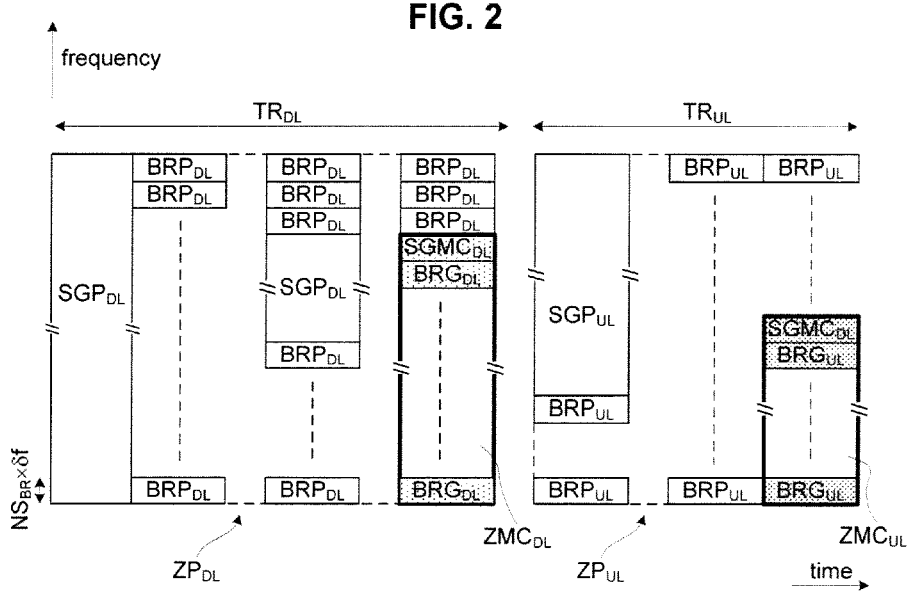
FIGS. 2 and 4 are time and frequency distribution diagrams for areas and blocks of radio resources in downward and upward frames according to the present method, system and device.

As shown on FIG. 2, each frame $TR_{DL}$, $TR_{UL}$ is configured into two areas of radio resources. A downward frame $TR_{DL}$ is divided into a first area $ZP_{DL}$ dedicated to signalling and traffic data to be emitted toward the first mobile terminals $MT_P$ and a second area $ZMC_{DL}$ dedicated to signalling and traffic data to be emitted toward the second mobile terminals $MT_G$. An upward frame $TR_{UL}$ is divided into a first area $ZP_{UL}$ dedicated to signalling and traffic data to be received from the first mobile terminals $MT_P$ and a second area $ZMC_{UL}$ dedicated to signalling and traffic data to be received from the second mobile terminals $MT_G$.

Figure 3:
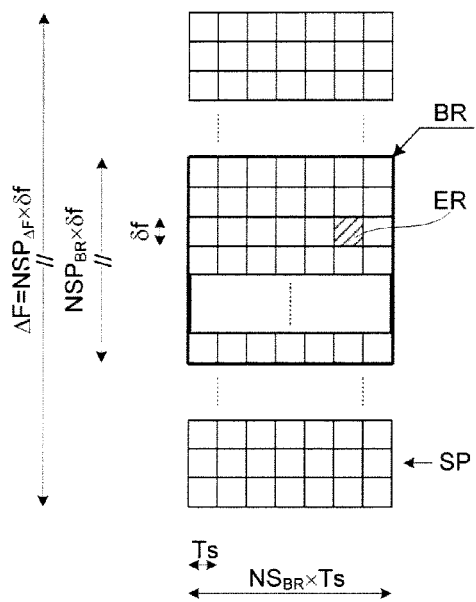
FIG. 3 shows a time and frequency diagram of a block of radio resource.

For the downward DL and upward UL links of communication, the base station BS shares with the mobile terminals radio resources distributed in a predetermined useful frequency broadband $\Delta F$ comprising $NSP_{\Delta F}$ sub-carriers SP having a narrow band of width $\delta f = \Delta F/NSP_{\Delta F}$ during a frame $TR_{DL}$ for the upward links or a frame $TR_{UL}$ for the downward links. At least one block of radio resources BR is allotted to an active link. As shown on FIG. 3, each block of resources comprises $NS_{BR} \times NSP_{BR}$ elements of radio resources ER distributed on $NS_{BR}$ consecutive symbol periods Ts and $NSP_{BR}$ consecutive or non consecutive sub-carriers SP. Each element of radio resources ER contains a symbol with orthogonal frequency distribution multiplexing OFDM ("Orthogonal Frequency Division Multiplexing"). The number $NS_{BR}$ may range for instance between 2 and 10 and the number $NSP_{BR}$ may range for instance between 10 and 30. Thus, a block of resources BR makes up the smallest unit of allotment during which the base station can transmit data to a mobile terminal on a downward link, or a mobile terminal can transmit data to the base station on an upward link. The characteristics of a data symbol in an element of resources ER of an active link depend on the flow-rate and on the type of modulation used for the data transmitted in the element of resources. For instance, the modulation is a modulation with a phase skip PSK or a modulation with a multiple level phase quadrature amplitude QPSK or QAM16 or QAM64. Different types of modulation may be used for one single block of resources in consecutive frames for instance for signalling or for data of user's traffic.

For instance according to a first embodiment, the downward links of communication DL and the upward links of communication UL are respectively of the orthogonal frequency multiplexing multiple access OFDMA type and of the multiple access multiplexing frequency single carrier SC-FDMA type. For the access OFDMA of a downward link DL, consecutive series of symbols are transmitted in parallel one after the other each on the $NSP_{BR}$ sub-carriers of a block during one of the $NS_{BR} \times Ts$ symbol periods. For the access SC-FDMA of an upward link UL, consecutive series of symbols are transmitted in series one after the other each on one of the $NSP_{BR}$ sub-carriers of a block during the slot $NS_{BR} \times Ts$ symbol periods.

The blocks of resources of traffic data allotted to a link with a mobile terminal in the frames $TR_{DL}$, $TR_{UL}$ make up a sub-channel SC. A sub-channel SC may comprise one or more blocks of resources in consecutive or non consecutive frames as a function, more specifically, of the quality of service including relative to the flow-rate in this link. The blocks of resources of the sub-channel SC may be distributed both in the frequency field on the sub-carriers as in the time field on the symbol periods in the frames. A block of resources having the same position in frequency and in time in downward or upward frames may be associated with different sub-channels and links. The blocks of resources extending on $NS_{BR}$ consecutive symbol periods Ts make up a time slot allotted a priori to several active links, at the level of one or more blocks of resources of the time slot per link.

Most often, the needs in flow-rates being high in the downward links, the downward frames $TR_{DL}$ have a duration, expressed in number of slots, higher than that of the upward frames $TR_{UL}$, as shown on FIG. 2.

The association of a block of resources of traffic data with a downward DL link or an upward UL link is decided by the base station BS. According to an example, the network RR operates in a frequency division duplex mode FDD ("Frequency Division Duplex"), and the base station BS simultaneously emits and receives blocks of resources distributed on two different sets of $NSP_{BR}$ frequencies respectively associated with the downward and upward links of a communication with a mobile terminal $MT_P$. According to another example, the network RR operates in a time division duplex mode TDD ("Time Division Duplex"), and the base station BS emits and receives during time slots $NSY_{BR} \times Ts$ different from the blocks of resources on a common set of $NSP_{BR}$ frequencies and respectively associated with the downward and upward links of a communication with a mobile terminal $MT_P$.

The areas $ZP_{DL}$, $ZP_{UL}$ in the frames are allotted as known to conventional links for communications with the mobile terminals of lower priority $MT_P$ having their users, such as private persons and company staff, making up, for most of them, the general public. Hereinafter the known frame characteristics are reminded, being located in the first areas $ZP_{DL}$ and $ZP_{UL}$ of the frames $TR_{DL}$ and $TR_{UL}$ according to the present method, system and device.

As shown on FIG. 2, the area $ZP_{DL}$, $ZP_{UL}$ comprises at least one signalling field $SGP_{DL}$, $SGP_{UL}$ and an area of resources for traffic data represented by blocks of traffic data $BRP_{DL}$, $BRP_{UL}$. The signalling field $SGP_{DL}$, $SGP_{UL}$ occupies the start of the frame for instance on one to three first symbol periods. The frame may also contain other signalling fields. A signalling field may occupy one or more consecutive symbol periods and extend on the $NSP_{\Delta F}$ sub-carriers or on some consecutive sub-carriers (SP). A block of traffic data $BRP_{DL}$, $BRP_{UL}$ may contain traffic and signalling data in a lower amount. On FIGS. 2 and 4, it has been assumed that the fields dedicated to the signalling have the width of a slot.

Signalling in a downward frame $TR_{DL}$ may be relative including to the timing SYNC between the base station and the mobile terminals, to symbols of pilots distributed in the frame for an evaluation of channels of propagation for the links, to the base station cell research and identification by the mobile terminals, to the allotment of resources such as the arrangement of sub-carriers and blocks of resources of traffic data $BRP_{DL}$ and $BRP_{UL}$ allotted to the mobile terminals in the downward frame and optionally in the downward frame, to the point to point ("unicast") and multidiffusion ("multicast") transport, to the random accesses for establishing a call, to the requests for repetition and to the acknowledges, etc. Signalling in an upward frame TRUL may be relative more specifically to the allotment of resources such as the arrangement of sub-carriers and the blocks of resources of traffic data allotted to the mobile terminals in the upward frame if such an allotment of resources is not included in the frame of downward link, pilots, power, frequency and time settings, acknowledges, requests, etc.

For instance, according to a first embodiment, the broadband radio communications network RR is based on the known technology LTE ("Long Term Evolution") with a band width $\Delta F$ from several hundreds of MHz to a few GHz and a transmission in a duplex or semi-duplex mode FDD or TDD and flow-rates lower than 330 Mbits/s for the downward links and lower than 90 Mbits/s for the upward links. The band $\Delta F$ is for instance of 20 MHz so as to contain about one hundred blocks of useful resources on $NSP_{AF}=2048$ sub-carriers SP. A block of resources $BRP_{DL}$, $BRP_{UL}$ spreads for instance on a slot of 7 symbol periods Ts=71.4 µs, including with a guard time for a cyclic prefix being a copy of the end of the following symbol period, that is 0.5 ms, and on $NSP_{AF}=12$ sub-carriers of width $\delta f=15$ kHz. Each frame comprises 20 time slots and has a duration of 10 ms. The downward frames $TR_{DL}$ comprise blocks of resources of the access OFDMA type and the upward frames $TR_{UL}$ comprise blocks of resources of the access SC-FDMA type.

The allotment of resources by blocks according to the technology LTE is achieved in each sub-frame made of two consecutive slots. The distribution into two areas of resources ZP and ZMC according to the present method, system and device is effective in predetermined sub-frames of each sub-frame.

Signalling in a downward frame $TR_{DL}$ for instance in FDD mode may comprise signalling fields including for a reference (pilot) signal RS in the first and fifth symbol periods of each slot, a channel of physical control PDCCH for the block arrangement and acknowledge in the three first symbol periods from the first slot in each of 10 sub-frames to two consecutive slots, channels of primary P-SCH and secondary S-SCH timing of a few central sub-carriers in the seventh and sixth symbol periods of the first and eleventh slots, and a physical diffusion channel PBCH on a few central sub-carriers in the first four symbol periods of the second slot. The remaining elements of radio resources are resources being available for data of user's traffic ("payload") making up a physical shared channel PDSCH.

Signalling in an upward frame $TR_{UL}$ may comprise signalling fields relative including to a reference (pilot) signal RS distributed for instance in the last five symbol periods of each slot, and a channel of random access PRACH and a channel of physical control PUCCH for rearranging resources and acknowledging requests in the first two symbol periods of each slot. The remaining elements of radio resources are resources being available for data of user's traffic making up a physical shared channel PUSCH.

A known upward or downward frame such as described above is thereby only divided into signalling fields and the area of resources for traffic data occupying the major part of the frame. The area of resources for traffic data is conventionally shared between the communications of the mobile terminals $MT_P$ with the base station BS in the useful frequency broadband $\Delta F$.

The area $ZP_{DL}$, $ZP_{UL}$ in a frame $TR_{DL}$, $TR_{UL}$ of the present method, system and device is thus similar to a known frame for signalling and traffic data relative to the first mobile terminals $MT_P$. The area $ZP_{DL}$, $ZP_{UL}$ is available most often for narrow band services such as the voice on IP ("internet Protocol") and sometimes for other broadband services of the point to point type ("unicast") or of the point to multipoint type, so-called multidiffusion ("multicast"), such as evolved multimedia broadband cast/multicast services eMBMS ("evolved Multimedia Broadcast Multicast Service") or cast/multicast services on a single frequency network MBSFN ("Multimedia Broadcast over Single Frequency network") for instance relative to video, such as television or videoconference services for mobile terminals, or any other data service being specific to any interactivity between a base station and a mobile terminal as a navigation on Internet. The applications in mobile terminals $MT_P$ and the base station BS in the shape of computer modules for processing user's data relative to such needs have thus different needs in quality of service. The quality of service of an upward or downward link of communication depends on parameters of quality, such as a flow-rate able to be included between minimum and maximum flow-rates, a periodicity of radio resources, a duration of communication, a jitter, a waiting period of time, a priority and an error rate, transmitted in a request by an application to an allotter in the base station BS.

The acceptation of the resources required for a link of communication by the base station BS depends on the resources being available in the corresponding area $ZP_{DL}$, $ZP_{UL}$ that are not already occupied by other active links. The required resources may thus be partially accepted or rejected as a function of the available resources and of the parameters of quality associated with the link. Moreover, the position of the block(s) of resources $BRP_{DL}$, $BRP_{UL}$ allotted to the traffic data of a link in the frames $TR_{DL}$, $TR_{UL}$ is not strictly determined and is periodically modified by the dynamic management of resources in the base station BS as a function of the variable needs in traffic of the applications in the base station and the mobile terminals $MT_P$. After a predetermined number of frame periods, for instance a few frame periods defining a period of block arrangement, the base station BS dynamically arranges the resources of the area $ZP_{DL}$, $ZP_{UL}$ allotting to the active links the blocks of resources $BRP_{DL}$, $BRP_{UL}$ having a priori positions in the frame being different from those during the previous arrangement period of block. The periodical arrangement of blocks follows allotment rules depending, amongst others, on conditions of propagation in the links, on occupation rates of the blocks and on the distances between the terminals $MT_P$ and the base station BS including for decreasing the interferences between close sub-channels. Should the area $ZP_{DL}$, $ZP_{UL}$ be saturated or the network RR be overloaded, flow-rates required or obtained by the links might be decreased and/or incoming or outgoing calls might be rejected and/or some classes of communication might be interrupted.

Consequently, the variable and dynamic and therefore unsure shared allotment of blocks of resources $BRP_{DL}$ and $BRP_{UL}$ in the first areas $ZP_{DL}$ and $ZP_{UL}$ of the downward and upward frames $TR_{DL}$ and $TR_{UL}$ to the mobile terminals of low priority $MT_P$ does not have a sufficient safety for communications with the mobile terminals of critical mission $MT_G$ of high priority that should be established rapidly and kept without any disturbance, independently of any incident linked to communications of low priority.

Figure 5:
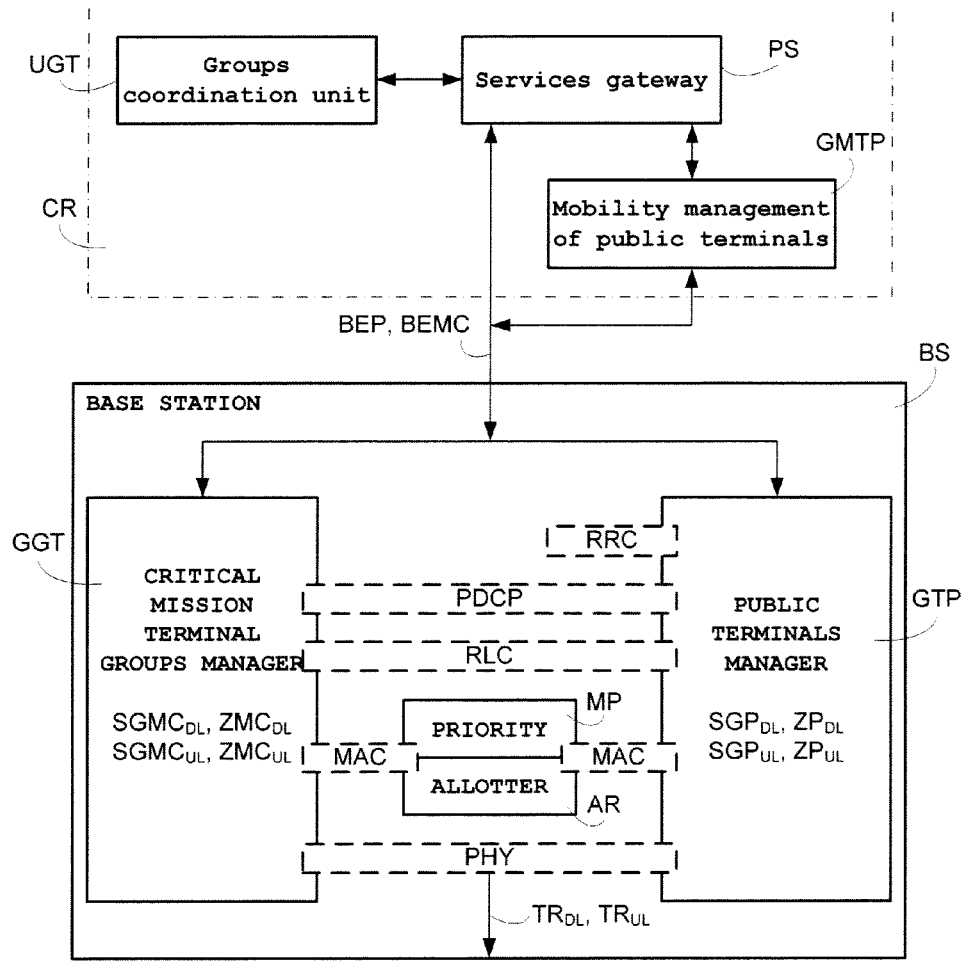
FIG. 5 is a schematic flowchart of a base station according to the present method, system and device in the broadband radio communications network.

Referring now to FIG. 5, the base station BS makes up a node B evolved in a universal terrestrial radio access network UTRAN ("Universal Terrestrial Radio Access Network") and is linked to a mobility management unit GMTP for mobile terminals of low priority $MT_P$ and to a gateway of services PS in the core CR of the network RR. The unit GMTP manages, more specifically, the establishment and the release of the links of communication and the transfer of the mobile terminals of low priority $MT_P$ from one cell to another cell. The gateway PS gives access to various other networks of communication such as cellular radio networks, the internet and a switched telephone network. The unit GMTP and the gateway PS communicate with the base station BS by radio access bearers BEP being streams of packets and some of which ("signalling radio bearer") transport exchanged signalling with the base station and others of which ("data radio bearer") transport traffic data adapted to be exchanged with the mobile terminals of low priority $MT_P$. The radio access bearers depend on the quality of service including in terms of flow-rate of the communications with the mobile terminals $MT_P$.

The base station BS of the present method, system and device shown on FIG. 5 only represents schematically functions relating to the present method, system and device and able to correspond to software modules implemented in one or more processors and/or to dedicated or programmable hardware modules. In particular, for a radio cell, the base station BS comprises a radio resource manager GTP for the mobile terminals of low priority $MT_P$, a radio resource manager GGT for groups of professional terminals $MT_G$ of critical mission (MC), and a resource allotter AR and a priority module MP linked to the managers GTP and GGT.

The manager GTP manages the resources at the radio interface between the base station BS and the mobile terminals of low priority $MT_P$. The manager GTP provides the various functionalities of different protocol layers for processing the radio access bearers being received BEP and building radio access bearers BEP to be transmitted to the gateway PS and to the unit GMTP and for building and allotting sub-channels of transport to be emitted toward the terminals $MT_P$ and to be received from the terminals $MT_P$. A radio resource control RRC ("Radio Resource Control") layer manages the signalling relative including to the link establishment and release and the mobility of terminals $MT_P$ in the radio access bearers for connections between the terminals $MT_P$ and the network core CR. A packet data convergence protocol PDCP ("Packet data Convergence Protocol") layer is to be used, including to the data compression-decompression and to the data deciphering-ciphering in the radio access bearers BEP. A radio link control RLC ("Radio Link Control") layer disassembles the packets from the radio access bearers into a protocol data unit in distinct logical channels for the signalling and traffic data and reassembles the protocol data units into packets, and processes transmission errors so as to repeat packets being received erroneous or not received. An access control MAC ("Media Access Control") layer formats by means of the allotter AR the signalling and traffic data into blocks of resources $BR_{DL}$ and $BR_{UL}$ and arranges the blocks of resources in the areas $ZP_{DL}$ and $ZP_{UL}$ of the frames $TR_{DL}$ and $TR_{UL}$ for the transport of the signalling and traffic data in sub-channels. The module of priority MP at the level of the layer MAC processes access priorities to sub-channels between the terminals $MT_P$. Finally, a physical layer PHY provides, more specifically, the coding-decoding, the modulation-demodulation OFDM and the emission and reception of the signalling and traffic data in the transport sub-channels at the radio interface with the mobile terminals $MT_P$. In particular, according to the above mentioned example relative to the technology LTE, the physical layer forms the above mentioned channels PDCCH, P-SCH, S-SCH, PBCH and PDSCH in the first area $ZP_{DL\ of\ the}$ downward frames $TR_{DL}$ and extracts the above mentioned channels PRACH, PUCCH and PUSCH from the first area $ZP_{UL}$ of the upward frames $TR_{UL}$.

The allotter AR controls dynamically the allotment of resources in time and frequency in the frames $TR_{DL}$ and $TR_{UL}$ to the downward DL and upward UL links with the mobile terminals as a function of allotment rules depending on the quality of service required for the data to be transmitted in the links and the conditions of propagation in the links. The module of priority MP is backed on to the allotter and gives a priority of access to resources in streams of traffic data relative to some categories of terminals compared to other categories of terminals as a function of priority rules, as further explained later on.

The manager GGT has functionalities at the level of the layers PDCP, RLC, MAC and PHY for the second mobile terminals $MT_G$ similar to those of the manager GTP and other functionalities being specific to the character of a critical mission for which the mobile terminals $MT_G$ are used. The manager GGT exchanges, via the gateway of services PS, packets of radio access bearers BEMC with a coordination unit for groups of terminals of critical mission UGT. The unit UGT manages the constitution of several groups of terminals of critical mission, the identification of the groups and of the terminals $MT_G$ in these groups and the calls from the terminals $MT_G$ and coordinates the mobility of the terminals $MT_G$ between the radio cells of the base stations of the network RR. The unit UGT re-emits traffic data from a terminal of a group in a cell toward all the other terminals of the group able to be distributed in different radio cells of the network RR. The number of groups of mobile terminals $MT_G$ is at least equal to 1 and each group G may comprise several tens or hundreds of mobile terminals $MT_G$.

A critical mission (MC) of public security relates to an event such as a manifestation or an accident being managed by a professional user group, such as policemen, fire brigade and personnel of an emergency medical aid service. The members of a group should communicate between them safely, without interruption. As shown on FIGS. 1, 4 and 5, the number of the groups is for instance of three G0, G1 and G2. In each group of critical mission G0, G1, G2, any mobile terminal $MT_{G0}$, $MT_{G1}$, $MT_{G2}$ being member of the group, linked to the cell of the base station BS as a result of the allotment of at least one downward multicast sub-channel can transmit traffic data to the group, for instance of voice, broadcast through the unit UGT and the manager GGT to other mobile terminals being members of the group linked to the base station BS and, if appropriate, to other mobile terminals being members of the group linked to other base stations according to the present method, system and device and optionally to stationary terminals being members of the group being for instance located in an information and controlling centre in communication with the unit UGT. A mobile terminal $MT_{G0}$, $MT_{G1}$, $MT_{G2}$ may receive traffic data from any other mobile terminal or stationary terminal belonging to the group G0, G1, G2 through the network RR. The mobile terminals of the groups are terminals of high priority for instance similar to digital or analog management mobile terminals of the professional terrestrial radio type TETRA, TETRAPOL or P25.

In the base station BS, the manager GGT provides the above mentioned functionalities of the layers PDCP, RLC, MAC and PHY relatively to the traffic data and to the signalling for the mobile terminals $MT_{G0}$, $MT_{G1}$, $MT_{G2}$ in each of the groups G0, G1, G2. In particular, the manager GGT is in relationship with the allotter AR and the module of priority MP for allotting in priority resources in the shape of blocks of resources $BRG_{DL}$ and $BRG_{UL}$ at predetermined positions in frequency and in time in the second areas $ZMC_{DL}$ and $ZMC_{UL}$ of the frames $TR_{DL}$ and $TR_{UL}$ for traffic data from the mobile terminals of each group. According to pre-stored parameters of configuration in the manager GGT, the allotter configures sets of physical sub-channels dedicated respectively to the groups. A set of sub-channels for a group is to be allotted in priority to the data of traffic from the mobile terminals of the group. Consequently, as opposed to the allotment of a block for a mobile terminal of low priority, no variable selection of a block of resources available in the downward or the upward frames is provided for transmitting traffic data in relationship with a mobile terminal of a group.

Figure 4:
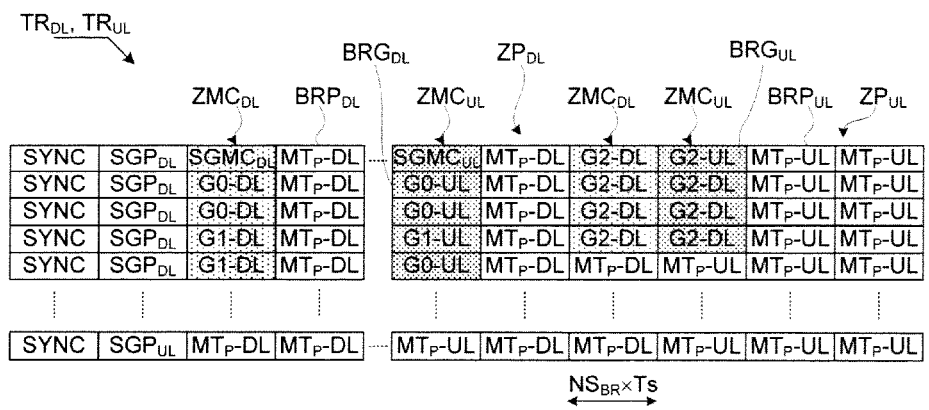

The example shown on FIG. 4 relates to intertwined frames $TR_{DL}$ and $TR_{UL}$ of the present method, system and device both in the frequency field as in the time field. The downward frame $TR_{DL}$ starts with a signalling field $SGP_{DL}$ including a timing field SYNC in the beginning of a frame and comprises a second broken down area $ZMC_{DL}$ comprising further to the signalling field $SGP_{DL}$ a signalling block for $SGMC_{DL}$ for signalling groups, 2 blocks of traffic data $BRG_{DL}(G0-DL)$ dedicated to traffic data of the group G0 and 2 blocks of traffic data $BRG_{DL}(G1-DL)$ dedicated to traffic data of the group G1, and more specifically after a part of the area ZPDL with numerous blocks BRPDL(MTP-DL) for terminals of low priority, 4 blocks of traffic data BRGDL(G2-DL) dedicated to traffic data of the group G2. The second area $ZMC_{UL}$ of the downward frame $TR_{UL}$ is also broken down and comprises a signalling block for $SGMC_{UL}$, 2 blocks of traffic data $BRG_{UL}$(G0-UL) dedicated to traffic data of the group G0, 2 blocks of traffic data $BRG_{UL}(G1-UL)$ dedicated to traffic data of the group G1 and 4 blocks of traffic data $BRG_{UL}(G2-UL)$ dedicated to traffic data of the group G2 preceeding a part of the area $ZP_{UL}$ with numerous blocks $BR_{UL}(MT_P-UL)$ for terminals of low priority $MT_P$.

The frequency band of the area of resources $ZMC_{DL}$, $ZMC_{UL}$ is only available for a limited number of links with mobile terminals of several groups of professional users. The area of resources $ZMC_{DL}$, $ZMC_{UL}$, whether broken down or not, dedicated in priority to traffic data for the critical mission has a predetermined location in the frame $TR_{DL}$, $TR_{UL}$, and is pre-dimensioned in terms of number of blocks of resources $BRG_{DL}$, $BRG_{UL}$ in the frame so that it meets maximum needs in quality of service of any critical mission. This means that the blocks of resources $BRG_{DL}$, $BRG_{UL}$ in the area $ZMC_{DL}$, $ZMC_{UL}$ are always available for being allotted to a critical mission, even if the area of resources $ZP_{DL}$, $ZP_{UL}$ for the links with the terminals of low priority $MT_P$ is overloaded. The communications for the critical mission are most often relative to voice in a narrow band and sometimes to services of broadband broadcast for instance for video and requiring a large number of resources. The quality of service for at least voice relative to each group is always provided in the area $ZMC_{DL}$, $ZMC_{UL}$.

For instance, the area of resources $ZMC_{DL}$, $ZMC_{UL}$ in each frame $TR_{DL}$, $TR_{UL}$ is statically dedicated to a predetermined number of voice radio sub-channels on IP at 20 kbits/s, a predetermined number of codec analog/digital voice radio sub-channels at 10 kbits/s and a predetermined number of radio data sub-channels with a higher flow-rate, by the manager GGT at the level of the layer MAC. For instance, 8, 16 or 24 sub-channels, including at least one downward sub-channel and at least one upward sub-channel for the signalling, each corresponding to a minimum source flow-rate of 64 kbits/s are automatically dedicated in a downward frame $TR_{DL}$ and a downward frame $TR_{UL}$ for each group.

The signalling fields $SGMC_{DL}$ and $SGMC_{UL}$ at the beginning of the areas $ZMC_{DL}$ and $ZMC_{DL}$ of the frames $TR_{DL}$ and $TR_{UL}$ are allotted to the signalling of the downward and upward links associated with the groups G0, G1 and G2 and particularly to the arrangement of the blocks of resources $BRG_{DL}$ and $BRG_{UL}$ of the downward and upward sub-channels associated respectively with the groups in the frames. The field $SGMC_{DL}$, $SGMC_{UL}$ contains for each link other data respectively similar to the data of signalling in the signalling field $SGP_{DL}$, $SGP_{UL}$. The signalling field $SGMC_{UL}$ is also used so that the manager GGT detects states of connection/listening of a downward sub-channel in multicast respectively by the mobile terminals of the groups G0, G1 and G2 in the upward frames $TR_{UL}$.

For instance, the signalling field $SGMC_{UL}$ is made up of 6 blocks of resources for managing 64 allotment requests RQA from the mobile terminals $MT_G$ belonging to the groups. The conflicts of access to the signalling field $SGMC_{UL}$ by the mobile terminals $MT_G$ are managed by the manager GGT evenly distributing the 6 blocks of resources, or the 3 pairs of blocks, dedicated to the field $SGMC_{UL}$ in each upward frame. Repeating an allotment request RQA in a common signalling sub-channel dedicated to a group by a mobile terminal $MT_G$ of this group may be triggered routinely, for instance 2 or 3 times without the base station transmitting to the terminal an acknowledge of each allotment request so that the base station allots a traffic data sub-channel in the area $ZMC_{UL}$ to the mobile terminal $MT_G$. Such conditions increase the probability of a correct detection of each allotment request by the manager GGT and the rapidity of a mobile terminal $MT_G$ to be allowed by the manager GGT via the allotter of resources AR to transmit data to the other terminals of its group.

At least one upward sub-channel should be dedicated to a group so as to ensure an emission at least of the voice from a mobile terminal $MT_G$ of the group G, while a downward sub-channel is dedicated to the group G so as to ensure that each mobile terminal of the group is able to receive in multicast at least voice from the other mobile terminals being members of the group. Consequently, an upward sub-channel allotted to a group is less used and more available than a downward sub-channel allotted to the group. The number of traffic sub-channels being multiplexed in the area $ZMC_{UL}$ of the frames of upward link $TR_{UL}$ may be equal to or lower than the number of traffic sub-channels multiplexed in the area $ZMC_{DL}$ of the frames of downward link $TR_{DL}$. Preferably, the multiplexed traffic data sub-channels dedicated to each group are statically gathered in the frame $TR_{DL}$, $TR_{UL}$, facilitating addressing sub-channels in the frames.

A block of resources of a sub-channel being permanently dedicated to a group has always the same position in a frame $TR_{DL}$, $TR_{UL}$, that is in consecutive or non consecutive frames $TR_{DL}$, $TR_{UL}$ depending on the predetermined flow-rate of the sub-channel, and is not modified after each period of arrangement of blocks allotted to mobile terminals of low priority $MT_P$.

Figure 6:
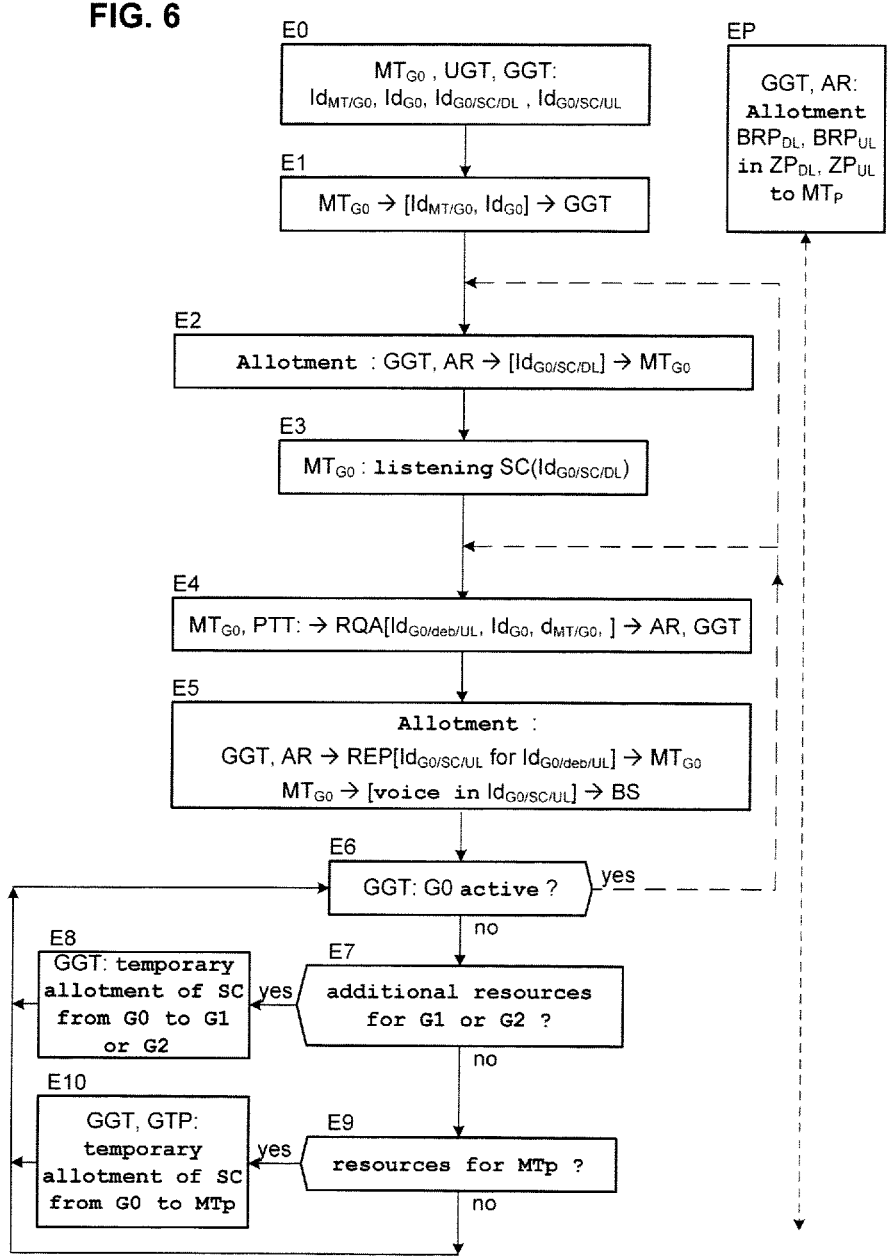
FIG. 6 is an algorithm of the method of allotment of radio resources according to the present method, system and device.

Referring to FIG. 6, the allotment of sub-channels to a group of critical mission, for instance the group G0, in the base station BS according to the present method, system and device comprises steps E0 to E10. Steps similar to steps E0 to E10 are carried out for the allotment of sub-channels to each of the other groups G1 and G2.

In the preliminary step E0, each of the mobile terminals MTG0 belonging to the group G0 memorizes its identifier $Id_{MT/G0}$, an identifier $Id_{G0}$ of the group G0 and identifiers $Id_{G0/SC/UL}$ for type of data to be emitted associated respectively with different source flow-rates and thus in sub-channels SC dedicated to the group G0 and arranged in the area $ZMC_{UL}$ of the upward frames. Such identifiers are converted into the terminals of the group G0 in a more readable form for professional users and are also memorized in the unit UGT and the manager GGT according to the present method, system and device. The unit UGT and the manager GGT have also pre-stored in association with the identifier $Id_{G0}$ of the group G0 the identifiers $Id_{G0/SC/UL}$ and identifiers $Id_{G0/SC/DL}$ of type of data to be emitted to the mobile terminals $MT_{G0}$ and therefore associated respectively with sub-channels SC at different source flow-rates dedicated to the group G0 and arranged in the area $ZMC_{DL}$ of the downward frames. The above mentioned identifiers are to be transmitted in the signalling fields $SGMC_{DL}$ and $SGMC_{UL}$. The identifiers $Id_{G0/SC/DL}$ and $Id_{G0/SC/UL}$ enable to identify the positions of the blocks of resources dedicated to the sub-channels of traffic data relative to the group G0 in the allotter AR and depend on the pre-configuration of the areas $ZMC_{DL}$ and $ZMC_{UL}$ in the frames.

Simultaneously to the hereinafter described steps E1 to E10, the manager GTP in relation with the allotter AR allots, as known in a step EP, blocks of resources $BRP_{DL}$ and $BRP_{UL}$ in the first areas $ZP_{DL}$ and $ZP_{UL}$ of the downward and upward frames shared between traffic data emitted to and received from the mobile terminals of low priority $MT_P$. The positions of a block of resources $BRP_{UL}$ allotted to the traffic data to be emitted toward a terminal $MT_P$ and of a block of resources $BRP_{UL}$ allotted to the traffic data to be received from the terminal $MT_P$ are variable in the areas $ZP_{DL}$ and $ZP_{UL}$.

It is assumed that the users of the group G0 have received as instructions switching to the network RR so as to receive in multicast the data of a traffic sub-channel in the downward frames $TR_{DL}$ having the given identifier $Id_{G0/SC/DL}$ and dedicated to the group G0. Alternatively, at least two or more of sub-channels of multicast traffic having different flow-rates and dedicated to the group G0 are allotted simultaneously in the area $ZP_{DL}$ of the downward frames $TR_{DL}$ to the mobile terminals $W_{G0}$.

As soon as the user of a mobile terminal $MT_{G0}$ of the group G0 starts to operate the latter in step E1, the terminal $MT_{G0}$ reads in memory its identifier $Id_{MT/G0}$ and the identifier $Id_{G0}$ of the group G0. The mobile terminal $MT_{G0}$ emits the identifiers $Id_{MT/G0}$ and $Id_{G0}$ in the signalling field $SGMC_{UL}$ of at least one downward frame so that the manager GGT records the presence of at least one member of the group G0 in the radio cell. In step E2, under the control of the manager GGT, the allotter AR allots in priority to the group G0 at least one sub-channel of voice dedicated to the group G0 in the downward frames if the mobile terminal $MT_{G0}$ is the first of the group to become signalled in the cell of the base station BS. The allotter AR introduces the identifiers $Id_{G0/SC/DL}$ and $Id_{G0/SC/UL}$ of sub-channels of voice in the signalling field $SGMC_{DL}$ of the downward frames. In step E3, the mobile terminal $MT_{G0}$ remains afterwards on the listening of the voice of other users of the group G0 in the traffic sub-channel SC designated by the given identifier $Id_{G0/SC/DL}$ it detects in the downward frames $TR_{DL}$.

Alternatively, the allotment of a traffic sub-channel in multicast SC in step E2 can also be involved when an application in the manager GGT has received an allotment request from the unit UGT when another terminal of the group G0 wishes to transmit traffic data with another predetermined flow-rate for instance, a higher one. In such a case, the sub-channel having said predetermined flow-rate and dedicated to the group G0 in the area $ZMC_{DL}$ is allotted by the manager GGT and the allotter AR in priority to traffic data transmitted by said other terminal of the group G0.

If the user of the terminal $MT_{G0}$ notices that no member of the group speaks in the traffic sub-channel designated by the identifier $Id_{G0/SC/DL}$ and wishes to talk in step E4, it presses a push-to-talk button PTT ("Push-To-Talk") triggering an allotment request RQA of the RACH type ("Random Access Channel") including an identifier of flow-rate of voice IdG0/deb/UL and the identifiers IdG0 and IdMT/G0 via the signalling field SGMCUL of at least one upward frame. In a reply REP to the request RQA, the manager GGT includes in step E5 the identifier $Id_{G0/SC/UL}$ of a traffic sub-channel SC being available for voice associated with the identifier of flow-rate $Id_{G0/deb/UL}$ and being dedicated to the group G0 in the area $ZMC_{UL}$ of the upward frames $TR_{UL}$, and controls the allotment of the sub-channel being available in the allotter AR. The terminal $MT_{G0}$ detects the identifier $Id_{G0/SC/UL}$ in the field $SGMC_{DL}$ of a next downward frame. The user's voice is then emitted by the traffic sub-channel being available toward the base station BS diffusing the user's voice toward the other terminals of the group G0 through the sub-channel of allotted traffic designated by the identifier $Id_{G0/SC/DL}$.

Each following talking is accompanied with no exchange of signalling between the mobile terminal $MT_{G0}$ and the base station BS for requiring a sub-channel available in the downward frames, as the allotment of the traffic sub-channel having the identifier IdG0/SC/DL and dedicated to a type of data of the group G0 in the downward frames is decided by the manager GGT preliminarily to any establishment of an upward link with a mobile terminal of the group G0. Indeed, the manager GGT does not comprise functionalities of the signalling layer RRC.

The connection of any other mobile terminal of the group G0 to the network RR so that the user of the latter talks with the other users of the group G0 is achieved through implementing steps E1 and E3 to E5. Step E5 may comprise in particular in the manager GGT an allotment request processing RQA repeated by mobile terminals of the group for overcoming possible collisions of allotment requests emitted simultaneously by these terminals.

The emission of data other than voice, with a higher flow-rate, from the terminal $MT_{G0}$ follows steps similar to steps E4 and E5 so that the terminal $MT_{G0}$ emits data with a higher flow-rate in an available traffic sub-channel adapted for this flow-rate in the upward frames and dedicated to the group G0 and a step similar to step E2 so that the base station BS diffuses the data at the higher flow-rate in an available traffic sub-channel adapted for this flow-rate in the downward frames. Changing the sub-channel flow-rate, or the selection of a higher sub-channel flow-rate so that the mobile terminal $MT_{G0}$ simultaneously receives en multicast for instance images or a video sequence and voice transmitted by another terminal of the group G0 in the downward frames, is decided by the user of the terminal $MT_{G0}$ as a result of instructions it has received.

In step E6, the manager GGT notices that no mobile terminal $MT_{G0}$ of the group G0 is active and thus on the listening of at least one sub-channel dedicated to the group G0. Step E6 may be prior to step E1 if no mobile terminal of the group G0 is notified to the manager GGT, or be subsequent to step E5 if all the mobile terminals of the group G0 are transferred to one or more other cells of the network RR, or even have their operation stopped. In step E7, the manager GGT controls via the module of priority MP the allotter AR so that the traffic sub-channels dedicated to the group G0 in the areas $ZMC_{DL}$ and $ZMC_{UL}$ of the frames $TR_{DL}$ and $TR_{UL}$ are temporarily available for an allotment in priority to the other groups G1 and G2. For instance, in step E8, a mobile terminal $MT_{G1}$ being a member of the group G1 decides to transmit data requiring a high flow-rate being higher than the flow-rate of any first sub-channel dedicated to the group G1 in the upward frames, or optionally to the sum of the flow-rates of these sub-channels, and being at the most equal to the flow-rate of one of the sub-channels dedicated to the first group G0, or optionally at the most equal to the sum of the flow-rates of the sub-channels dedicated to the first group G0. The manager GGT having received a request of resource with a high flow-rate RQA from the mobile terminal $MT_{G1}$ enables the allotter AR to temporarily allot to this terminal one or more sub-channels dedicated to the group G0 in the upward frames for emitting the data with a high flow-rate toward the base station BS and to temporarily allot to the group G1 one or more sub-channels dedicated to the group G0 in the downward frames for retransmitting in multicast the data with a high flow-rate to the other mobile terminals of the group G1, according to a procedure similar to steps E4 and E5. For instance, the data with a high flow-rate is relative to the image of a map on which the terminal $MT_{G1}$ is located or to a video sequence of a scene taken by the terminal $MT_{G1}$.

In step E7, the manager GGT notices that no terminal of the other groups G1 and G2 needs additional resources or the groups G1 and G2 are inactive. In step E9, the manager GGT communicates with the manager GTP so that the latter optionally identifies one or more links of communication for mobile terminals of low priority $MT_P$ having their needs in resources that are not met in at least one of the areas $ZP_{DL}$ and $ZP_{UL}$ of the frames. Otherwise stated, for instance the first area $ZP_{DL}$ in the frames $TR_{DL}$ is unavailable so that a portion of the latter is allotted to the traffic data to be emitted toward a mobile terminal $MT_P$. In step E10, the manager GGT controls, under the control of the manager GTP, the allotter AR via the module of priority MP so that the allotter temporarily allots in second priority one or more sub-channels dedicated to the group G0 in one or the two areas $ZMC_{DL}$ and $ZMC_{UL}$ to one or more links of communication with mobile terminals of low priority $MT_P$ as a function of unmet needs in resources of applications in these terminals of low priority and/or of applications in the base station for links with these terminals of low priority.

The resources dedicated to a group of critical mission in the areas $ZMC_{DL}$ and $ZMC_{UL}$ are thus allotted by a programmable order of priority in the module MP first to this group, then to one of the other groups, and finally to one or more mobile terminals of low priority $MT_P$. The module of priority associated with each sub-channel being allotted of a group a current index of priority so as to compare it to this index of priority of a group or of a terminal $MT_P$ having needs in flow-rate in order to decide whether the allotment requested in step E8 or E10 may be authorized.

The previous characteristics relative to the distribution of blocks of resources in the frames and particularly of blocks of resources per groups in the areas $ZMC_{DL}$ and $ZMC_{UL}$ and to the priorities associated with different types of mobile terminals ensure that the members of each group may rapidly access in priority and at any time radio resources being dedicated to the group.

During the temporary allotment of one or more sub-channels dedicated to the group G0 to one or more other groups G1 and G2 or to one or more mobile terminals of low priority $MT_P$, the manager GGT permanently monitors any activity of the group G0 in step E6. The manager GGT stops the temporary allotment at the next resetting of allotment as soon as the latter receives the attachment of at least one mobile terminal $MT_{G0}$ of the group G0 to the base station BS being signalled via the signalling field $SGMC_{UL}$ of a downward frame in step E2, so as to make fully available for the group G0 the sub-channels being dedicated to it.

According to a first example in the downward frames $TR_{DL}$, a first block of resources, two second blocks of resources and three third blocks in each downward frame $TR_{DL}$, or alternatively a first block of resources with a periodicity of block allotment of one period of frame TRDL out of six, a second block of resources with a periodicity of block allotment of one period of frame TRDL out of three and a third block of resources with a periodicity of block allotment of one period of frame TRDL out of two, define respectively first, second and third multiplexed sub-channels dedicated to the group of critical mission G0 corresponding to source flow-rates D, 2D and 3D expressed in kbits/s, so as to respectively retransmit voice, images and video sequences. The source flow-rate D is for instance equal to 64 kbits/s. If only the first sub-channel is occupied, the second and third sub-channels may be temporarily allotted in priority to at least one of the other groups G1 and G2 having their sub-channels being already occupied and no longer requiring resources for diffusing, for instance, photos or video sequences with a high definition. If the second sub-channel with a flow-rate 2D dedicated to the group G0 is not allotted to any group of critical mission, this second sub-channel may be allotted temporarily to downward links attached to two mobile terminals of lower priority $MT_P$ for transmitting voice to them.

According to a second example, the source flow-rates D, 2D and 3D are ensured for the group G0 dedicating to it less resources in the downward frames $TR_{DL}$ than according to the first example by means of divisions of a third sub-channel dedicated to the 3D source flow-rate as a function of variable needs in resource of the group G0. A first sub-channel with the flow-rate D corresponds to a first predetermined block of resources amongst the three blocks of resources dedicated to the third sub-channel at the 3D flow-rate in each downward frame $TR_{DL}$, or even according to the alternative, to a first block of resources with a periodicity of block allotment of one period of frame $TR_{DL\ out\ of}$ six and selected amongst the three blocks of resources dedicated to the third sub-channel at the 3D flow-rate in six consecutive frames $TR_{DL}$. A second sub-channel with the 2D flow-rate corresponds to two second blocks of resources selected amongst the three blocks of resources dedicated to the sub-channel at the 3D flow-rate in each downward frame $TR_{DL}$, or even according to the alternative, to two second blocks of resources having each a periodicity of block allotment of one period of frame $TR_{DL}$ out of six and selected amongst the three blocks of resources dedicated to the sub-channel at the 3D flow-rate in six consecutive frames $TR_{DL}$. In this second example, if the first blocks of resources are distinct from the second blocks of resources, the voice and images may be simultaneously diffused through the first and second multiplexed sub-channels, and the third sub-channel corresponding to the 3D source flow-rate may only be allotted without allotment of at least one of the first and second sub-channels.

According to an alternative of the second example in the downward or upward frames, three first sub-channels with the D flow-rate are dedicated to the group G0. A second sub-channel with the source flow-rate 2D is allotted aggregating two of the first three sub-channels. A third sub-channel with the source flow-rate 3D is allotted aggregating the first three sub-channels. The identifiers of one of the first sub-channels and of the second and third sub-channels are only available through the terminals.

For a simultaneous radio diffusion mode ("simulcast"), the group manager GGT may comprise a module of timing for synchronizing the transmission of a contents in one or more sub-channels dedicated to a group in the downward frames $TR_{DL}$ with the transmission of the same contents in one or more sub-channels dedicated to the group in the downward frames emitted by other base stations. In this embodiment, the portion of the area of resources $ZMC_{DL}$ of each frame $TR_{DL}$ dedicated to the above mentioned group is divided into a first sub-area dedicated to the multicast mode and a second sub-area dedicated to the not simultaneous normal casting mode. No block of resources in the first sub-area may be allotted to data streams in not simultaneous normal casting mode.

According to a second embodiment, the broadband radio communication network RR is based on the known WiMAX mobile technology ("Worldwide interoperability for Microwave Access") with a width of band $\Delta F$ of a few tens of GHz and a transmission for instance in a semi-duplex mode TDD and flow-rates lower than 75 Mbits/s for the downward links and lower to 25 Mbits/s for the upward links. The band $\Delta F$ is for instance of 20 MHz on $NSP_{\Delta F}=2048$ sub-carriers. The downward $TR_{DL}$ and upward $TR_{UL}$ frames are of the access OFDMA type. A block of resources $BR_{DL}$, $BR_{UL}$ allotted to data of a mobile terminal and pilot symbols of a downward link DL comprises 2 clusters each having 4 pilot symbols and spreading on 14 contiguous sub-carriers of width $\delta f=10.94$ kHz selected in the band $\Delta F$, that is $NSP_{BR}=28$, and on a common time slot of $NSY_{BR}=2$ periods of symbols each of Ts=102.9 µs, including with a guard time Ts/8, and $NSP_{AF}=28$ sub-carriers. The frame comprises 20 time slots and has a duration of 10 ms. For instance, a block of resources of an upward link $BR_{UL}$ comprises six tiles each having 4 pilot symbols and spreading on 4 sub-carriers selected in the band $\Delta F$, that is $NSP_{BR}=24$, of width $\delta f=10.94$ kHz and on a common time slot of $NSY_{BR}=3$ periods of symbols each of Ts=102.9 µs, including with a guard time of Ts/8.

A downward frame $TR_{DL}$ and an upward frame $TR_{UL}$ associated with a base station cell of the present method, system and device are separate with a guard interval and make up sub-frames of a composite frame having a duration of 5 ms. For instance, the downward frame $TR_{DL}$ spreads on a number of symbol periods higher than that of the frame of the upward link.

The described method, system and device relate to a method and a base station for allotting radio resources. According to one implementation, the steps of the present method are determined by the instructions of a computer programme incorporated into the base station. The programme able to be implemented in the base station of the present method, system and device comprises programme instructions which, when said programme is carried out in the base station the operation of which is then controlled by the implementation of the programme, carry out the steps of the method according to the present disclosure.

Consequently, the present method, system and device also apply to a computer programme, including a computer programme recorded on or in a recording medium readable by a computer and any device for processing data, adapted for implementing the present method, system and device. This programme may use any programming language, and be in the shape of a source code, an object code or an intermediary code between a source code and an object code such as in a partially compiled shape or in any other shape desired for implementing the method according to the present disclosure. The programme may be downloaded in the base station via a network of communication, such as internet.

The recording medium may be any entity or device capable of storing the programme. For example, the medium may comprise a storage medium, on which the computer programme according to the present method, system and device is recorded, such as a ROM, e.g. a CD ROM or a microelectronic circuit ROM, or even a USB key, or a magnetic recording medium, e.g. a floppy disk or a hard disk.

The invention claimed is:

1. A method in a base station for allotting blocks of radio resources to mobile terminals in downward frames emitted by the base station and in upward frames received from the mobile terminals, the blocks of resources being distributed in time and in frequency in the frames, said method comprising:
   a configuration of each downward frame into first and second areas dedicated to data respectively to be emitted toward a plurality of first mobile terminals and a plurality of second mobile terminals and from each downward frame into first and second areas dedicated to the data respectively to be received from the first and second mobile terminals,
   an allotment of blocks of resources in the first areas of downward and upward frames shared between data to be emitted to and to be received from the first mobile terminals, the positions of a block of resources allotted to data to be emitted toward the first mobile terminal and of a block of resources allotted to data to be received from the first mobile terminal being variable in the first areas,
   an allotment of at least one block of resources having a predetermined position in the second areas of the downward frames in priority to data to be emitted toward all of the plurality of the second mobile terminals, and
   an allotment of at least one block of resources having a predetermined position in the second areas) of the upward frames in priority to data to be received from one of the plurality of the second mobile terminals.

2. The method according to claim 1 further comprising:
   a configuration of the second area of each downward frame into first sub-channels dedicated to data to be emitted respectively toward groups of the plurality of the second mobile terminals, the first sub-channels having predetermined flow-rates and being each made of the at least one block of resources having the predetermined position in the second area of the downward frames, and a configuration of the second area of each upward frame into second sub-channels dedicated to data to be received respectively from the groups of the plurality of the second mobile terminals, the second sub-channels having predetermined flow-rates and being each made up by the at least one block of resources having the predetermined position in the second area of the upward frames,
   an allotment of the first sub-channels in priority to data to be emitted respectively toward the groups of the plurality of the second mobile terminals, and
   an allotment of a second sub-channel dedicated to a group in priority to data to be received from one of the plurality of the second mobile terminals of the group.

3. The method according to claim 2, further comprising a dedication of first sub-channels having different predetermined flow-rates and made up respectively by blocks of resources having predetermined positions in the second area of the downward frames for a first of the groups of the plurality of the second mobile terminals, and an allotment of a first sub-channel in priority to data to be emitted with at the most the flow-rate of the first sub-channel toward the first group.

4. The method according to claim 3, wherein when the flow-rate of data to be emitted to a second group of the plurality of the second mobile terminals is higher than the flow-rate of any first sub-channel dedicated to the second group of the plurality of the second mobile terminals and at the most equal to the flow-rate of one of said first sub-channels dedicated to the first group of the plurality of the second mobile terminals, the method further comprises a temporary allotment of said a first sub-channel to the data to be emitted to said second group of the plurality of the second mobile terminals as long as no data is to be emitted to a first group of the plurality of the second mobile terminals in said a first sub-channel.

5. The method according to claim 3, wherein when the first area in the downward frames is unavailable so that a portion of the latter is allotted to data to be emitted toward a first mobile terminal, the method further comprises a temporary allotment of one of said first sub-channels to data to be emitted toward the first mobile terminal as long as no data is to be emitted toward the groups of the plurality of the second mobile terminals in said a first sub-channel.

6. The method according to claim 3, comprising a dedication of second sub-channels having different second predetermined flow-rates and made up respectively by blocks of resources having predetermined positions in the second area of the upward frames for the first group of the plurality of the second mobile terminals, and an allotment of a second sub-channel in priority to data to be received with at the most the flow-rate of the first sub-channel of one of the first group of the plurality of the second mobile terminals.

7. The method according to claim 6, wherein when the data flow-rate to be received from one of the second group of the plurality of the second mobile terminals is higher than the flow-rate of any sub-channel dedicated to the second group of the plurality of the second mobile terminals and at the most equal to the flow-rate of one of said second sub-channels dedicated to the first group of the plurality of the second mobile terminals, the method further comprises a temporary allotment of said a second sub-channel to the data to be received from one of the terminals of the second group of the plurality of the second mobile terminals as long as no data is to be received from the first group of the plurality of the second mobile terminals in said a second sub-channel.

8. The method according to claim 6, wherein when the first area in the upward frames is unavailable so that a portion of the latter is allotted to the data to be received from a first mobile terminal, the method further comprises a temporary allotment of one of said second sub-channels to the data to be received from the first mobile terminal as long as no data is to be received from the mobile terminals of the groups of the plurality of the second mobile terminals in said a second sub-channel.

9. The method according to claim 6, wherein a second sub-channel is allotted to the data to be received from a mobile terminal of the first group of the plurality of the second mobile terminals when the base station has received at least one of several allotment requests emitted in a signalling field of the upward frames by said mobile terminal of the first group of the plurality of the second mobile terminals.

10. The method according to claim 3, wherein sub-channels in the upward or downward frames dedicated to a group of mobile terminals have multiple integer flow-rates of a minimum flow-rate of one of the sub-channels, and a sub-channel dedicated to the group having a flow-rate immediately higher than that of another sub-channel dedicated to the group comprises the blocks of resources dedicated of the other sub-channel.

11. A system of downward frames to be emitted by a base station toward mobile terminals and of upward frames to be received from mobile terminals by the base station, blocks of resources being distributed in time and in frequency in the frames, said system comprising:
   in each downward frame first and second areas dedicated to data respectively to be emitted toward a plurality of first mobile terminals and a plurality of second mobile terminals and in each upward frame first and second areas dedicated to data respectively to be received from the plurality of first mobile terminals and the plurality of second mobile terminals,
   in the first areas of the downward and upward frames, blocks of resources to be allotted in a shared way between data to be emitted toward and to be received from the plurality of first mobile terminals,
   the positions of a block of resources to be allotted to data to be emitted toward a first mobile terminal and of a block of resources to be allotted to the traffic data to be received from the first mobile terminal being, variable in the first areas,
   in the second areas of the downward frames, at least one block of resources having a predetermined position to be allotted in priority to data to be emitted toward all of the plurality of the second mobile terminals, and
   in the second areas of the upward frames, at least one block of resources having a predetermined position to be allotted in priority to data to be received from one of the plurality of the second mobile terminals.

12. A base station able to allot blocks of radio resources to a plurality of first mobile terminals and a plurality of second mobile terminals in downward frames to be emitted by the base station and in upward frames to be received from the mobile terminals, the blocks of resources being distributed in time and in frequency in the frames, said base station comprising:
   a means for configuring each downward frame into first and second areas dedicated to data respectively to be emitted toward the plurality of first mobile terminals and the plurality of second mobile terminals and each upward frame into first and second areas dedicated to data respectively to be received from the plurality of first mobile terminals and the plurality of second mobile terminals,
   a means for allotting blocks of resources in the first areas of the downward and upward frames shared between data to be emitted toward and received from the plurality of first mobile terminals, the positions of a block of resources allotted to data to be emitted toward a first terminal and of a block of resources allotted to data to be received from the first mobile terminal being variable in the first areas,
   a means for allotting at least one block of resources having a predetermined position in the second areas of the downward frames in priority to data to be emitted toward all of the plurality of the second mobile terminals, and
   a means for allotting at least one block of resources having a predetermined position in the second areas of the upward frames in priority to data to be emitted by one of the plurality of the second mobile terminals.

13. A broadband radio communications network comprising base stations and mobile terminals, wherein each base station is defined according to claim 12.

14. A non-transitory computer readable medium containing a computer program being implementable in a base station, said program comprising instructions which implement the method according to claim 1, when the program is carried out in the base station.

15. The base station according to claim 12, further comprising first sub-channels having different predetermined flow-rates and made up respectively by blocks of resources having predetermined positions in the second area of the downward frames for a first of the groups of the plurality of the second mobile terminals, and an allotment of a first sub-channel in priority to data to be emitted with at the most the flow-rate of the first sub-channel toward the first group.

16. The base station according to claim 15, wherein when the flow-rate of data to be emitted to a second group of the plurality of the second mobile terminals is higher than the flow-rate of any first sub-channel dedicated to the second group of the plurality of the second mobile terminals and at the most equal to the flow-rate of one of said first sub-channels dedicated to the first group of the plurality of the second mobile terminals, the method further comprises a temporary allotment of said a first sub-channel to the data to be emitted to said second group of the plurality of the second mobile terminals as long as no data is to be emitted to a first group of the plurality of the second mobile terminals in said a first sub-channel.

17. The base station according to claim 15, wherein when the first area in the downward frames is unavailable so that a portion of the latter is allotted to data to be emitted toward a first mobile terminal, the method further comprises a temporary allotment of one of said first sub-channels to data to be emitted toward the first mobile terminal as long as no data is to be emitted toward the groups of the plurality of the second mobile terminals in said a first sub-channel.

18. The base station according to claim 15, comprising a dedication of second sub-channels having different second predetermined flow-rates and made up respectively by blocks of resources having predetermined positions in the second area of the upward frames for the first group of the plurality of the second mobile terminals, and an allotment of a second sub-channel in priority to data to be received with at the most the flow-rate of the first sub-channel of one of the first group of the plurality of the second mobile terminals.

19. The base station according to claim 18, wherein when the data flow-rate to be received from one of the second group of the plurality of the second mobile terminals is higher than the flow-rate of any sub-channel dedicated to the second group of the plurality of the second mobile terminals and at the most equal to the flow-rate of one of said second sub-channels dedicated to the first group of the plurality of the second mobile terminals, the method further comprises a temporary allotment of said a second sub-channel to the data to be received from one of the terminals of the second group of the plurality of the second mobile terminals as long as no data is to be received from the first group of the plurality of the second mobile terminals in said a second sub-channel.

20. The base station according to claim 18, wherein a second sub-channel is allotted to the data to be received from a mobile terminal of the first group of the plurality of the second mobile terminals when the base station has received at least one of several allotment requests emitted in a signalling field of the upward frames by said mobile terminal of the first group of the plurality of the second mobile terminals.

* * * * *

UNITED STATES PATENT AND TRADEMARK OFFICE
CERTIFICATE OF CORRECTION

| | | |
|---|---|---|
| PATENT NO. | : 8,989,134 B2 | Page 1 of 1 |
| APPLICATION NO. | : 13/375746 | |
| DATED | : March 24, 2015 | |
| INVENTOR(S) | : Laurent Pison and Olivier Paterour | |

It is certified that error appears in the above-identified patent and that said Letters Patent is hereby corrected as shown below:

In the claims

In column 19, line 61, delete "from each downward" and insert -- of each upward --, therefor.

Signed and Sealed this
Third Day of May, 2016

Michelle K. Lee
*Director of the United States Patent and Trademark Office*